United States Patent [19]

Kreuter

[11] Patent Number: 4,838,484
[45] Date of Patent: Jun. 13, 1989

[54] VARIABLE VOLUME AIR CONDITIONING SYSTEM WITH VELOCITY READOUT AT THE THERMOSTAT

[75] Inventor: Paul E. Kreuter, Thief River Falls, Minn.

[73] Assignee: Kreuter Manufacturing Co., Inc., New Paris, Ind.

[21] Appl. No.: 88,347

[22] Filed: Jul. 31, 1987

[51] Int. Cl.$^4$ .............................................. F24F 7/00
[52] U.S. Cl. ..................................... 236/49.3; 236/94; 165/111
[58] Field of Search ................. 236/94, 49 D; 165/11, 165/22

[56] References Cited

U.S. PATENT DOCUMENTS

| | | | |
|---|---|---|---|
| 3,719,321 | 3/1973 | McNabney | 236/49 |
| 3,941,310 | 3/1976 | Travaglio et al. | 236/49 |
| 4,077,567 | 3/1978 | Ginn et al. | 236/49 |
| 4,147,298 | 4/1979 | Leemhuis | 236/49 |
| 4,263,931 | 4/1981 | Bramow et al. | 137/84 |
| 4,264,035 | 4/1981 | Maxson et al. | 236/87 |
| 4,308,992 | 1/1982 | Horton | 236/94 X |
| 4,406,397 | 9/1983 | Kamata et al. | 165/22 X |
| 4,413,514 | 11/1983 | Bowman | 73/204 |
| 4,422,571 | 12/1983 | Bowman | 236/49 |
| 4,428,529 | 1/1984 | Bentsen | 236/49 |
| 4,467,956 | 8/1984 | Kreuter | 236/49 |

Primary Examiner—William E. Wayner
Attorney, Agent, or Firm—Kinney & Lange

[57] ABSTRACT

A variable volume air conditioning system of the type having a duct for distributing air to a room, a damper for regulating the flow of air through the duct, and a damper actuator responsive to damper drive control signals for controlling the damper. A thermostat located in the room provides a stat signal representative of a desired flow of air through the duct. An actual flow signal representative of the actual flow of air through the duct is provided by a sensor. The stat signal and actual flow signal are compared by a comparator which provides the damper drive control signals as a function of the comparison. A wire transmission line couples the actual flow signal from the sensor to the thermostat so that service personnel can easily monitor system performance.

15 Claims, 1 Drawing Sheet

VARIABLE VOLUME AIR CONDITIONING SYSTEM WITH VELOCITY READOUT AT THE THERMOSTAT

BACKGROUND OF THE INVENTION

1. Field of the Invention.

The present invention relates to systems for supplying conditioned air through a duct to a room. In particular, the present invention is a variable volume air conditioning system including means permitting service personnel to monitor actual air flow through the duct at the thermostat within the room.

2. Description of the Prior Art.

Variable volume air conditioning systems heat and cool rooms by adjusting the rate of flow (i.e. velocity) of air into each room or zone. The temperature of the incoming air remains constant. Air conditioning systems of these and other types, as well as apparatus for use therein, are disclosed in the following U.S. patents.

Travaglio et al. U.S. Pat. No. 3,941,310
McNabney U.S. Pat. No. 3,719,321
Ginn et al. U.S. Pat. No. 4,077,567
Leemhuis U.S. Pat. No. 4,147,298
Bramow et al. U.S. Pat. No. 4,263,931
Bentsen U.S. Pat. No. 4,428,529
Maxson et al. U.S. Pat. No. 4,264,035
Bowman U.S. Pat. No. 4,422,571
Bowman U.S. Pat. No. 4,413,514
Kreuter U.S. Pat. No. 4,467,956

The above patents disclose pneumatic air conditioning systems in which a pneumatic signal representative of a desired air flow is coupled from a thermostat located in the room in which the temperature is being regulated, to the air flow regulating apparatus. The pneumatic signal is determined as a function of sensed or actual temperature within the room, and a desired temperature set by its occupants or other personnel.

Electrical systems for controlling air flow in variable volume air conditioning systems are also known. In one such system an electrical signal representative of desired air flow is coupled from the room thermostat to the air flow regulating apparatus. This signal is applied across an input port of a bridge-type hot-wire anomometer air velocity sensor mounted within the duct. Air flow through the duct is impinged upon one or more temperature-sensitive resistors of the bridge. A comparator coupled to an output port of the bridge senses its balance state and provides signals which are used to control motors which open and close a damper to regulate the flow of air through the duct.

The control circuitry and damper actuating mechanisms of the above-described air conditioning systems, whether they be pneumatic or electrically actuated, are typically located in the ceiling of the room, adjacent the duct. It is often necessary to determine whether the regulating apparatus is providing the proper flow of air in response to the signals from the thermostat when servicing these systems. To do so a technician must climb into the ceiling in order to take measurements or otherwise determine from the control circuitry the actual flow of air through the duct. These service procedures are not only inconvenient, but they disturb personnel working within the room as well.

It is evident that there is a continuing need for improved air conditioning systems. An air conditioning system which permits a service technician to quickly and easily monitor its performance would be especially desirable.

SUMMARY OF THE INVENTION

The present invention is a circuit for use in conjunction with an air distribution system of the type having a duct for distributing air to a room, a damper for regulating the flow of air through the duct, and a damper actuator responsive to damper drive control signals for controlling the damper. The circuit includes stat means for providing a stat signal representative of a desired flow of air through the duct, and sensor means for providing an actual flow signal representative of the actual flow of air through the duct. Control means responsive to the stat means and the sensor means provide damper drive control signals as a function of the stat signal and the actual flow signal. Transmission means having a first end coupled to the sensor means and a second end terminating at a service accessible location in the room provide the actual flow signal to the room.

In the preferred embodiments the sensor means includes controlled signal source means for providing an actual flow signal representative of the actual flow of air through the duct as a function of a balance state signal. Temperature sensitive bridge means, at least partially exposed to the flow of air in the duct, have an input port connected to receive the actual flow signal from the controlled signal source, and an output port at which an output signal is provided as a function of the actual flow of air impinging upon the exposed portion of the bridge and the actual flow signal. Balance sensing circuit means coupled to receive the output signal from the output port of the bridge provide the balance state signal to the controlled signal source as a function of the balance state of the bridge. The bridge will be in a balanced state when the actual flow of air equals the desired flow of air. In still other embodiments, a display located at the stat means is coupled to the second end of the transmission means and provides a visual display of the actual flow of air through the duct.

The circuit of the present invention greatly simplifies the tasks of technicians servicing the air distribution system. The actual flow of air through the duct can be easily monitored at the thermostat using a volt meter, or by viewing the display. Service technicians need no longer climb into the ceiling to perform these functions. The system is therefore convenient, and eliminates disruption which may otherwise be caused to persons working within the room. Furthermore, the circuit provides a relatively inexpensive means for accurately controlling air flow.

DETAILED DESCRIPTION OF THE PREFERRED EMBODIMENTS

Figure 1:
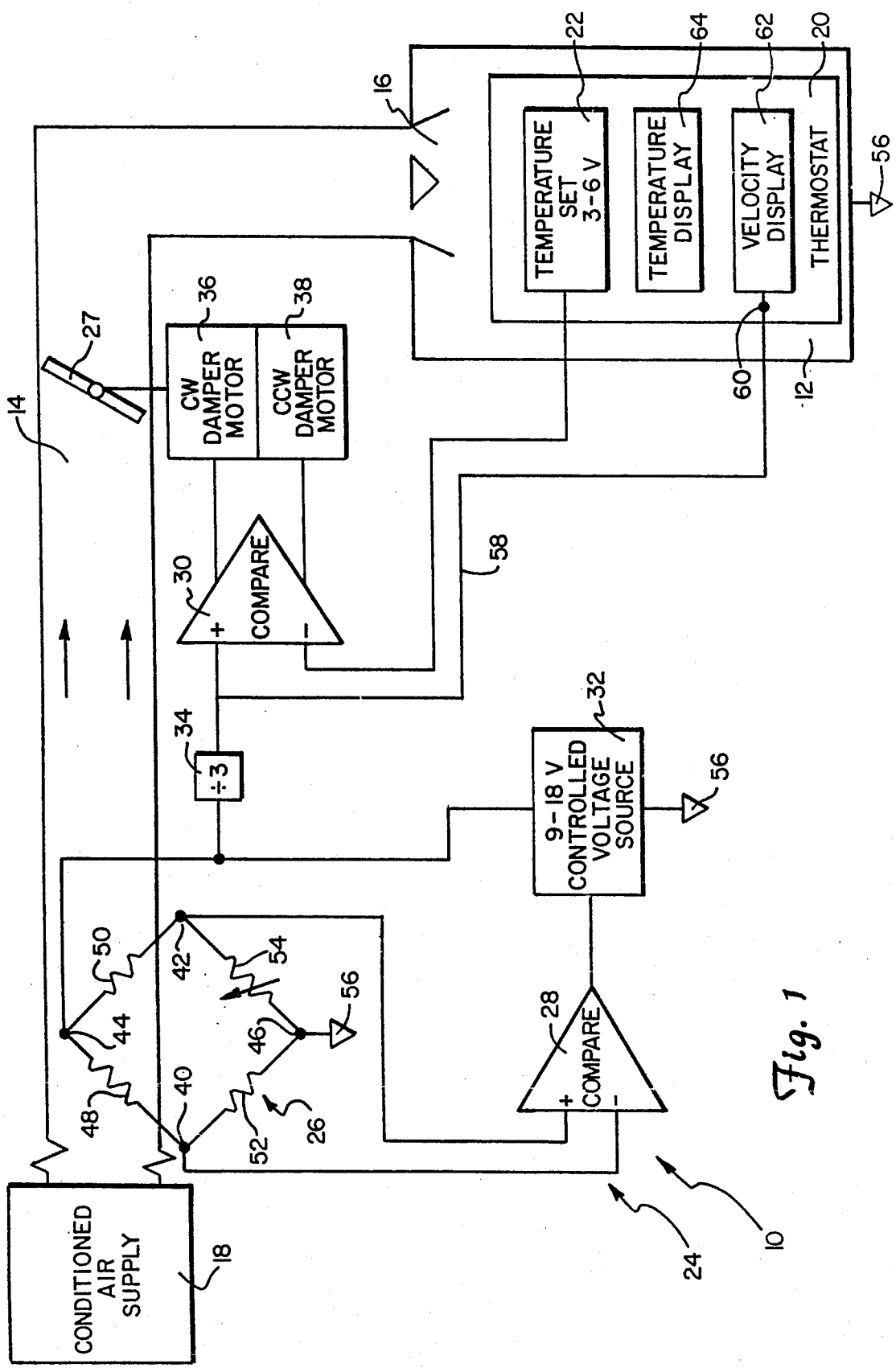
FIG. 1 is a schematic and block diagram representation of an air conditioning system in accordance with the present invention.

An air conditioning system 10 im accordance with the present invention is illustrated generally in FIG. 1. Air conditioning system 10 is a variable volume air conditioning system in which the temperature within room 12 is controlled by regulating the volume or flow of conditioned air supplied to the room through duct 14 and vent 16. Operation of variable volume air conditioning systems such as that illustrated in FIG. 1 are well known. Conditioned air supply 18 forces conditioned air which is at a constant temperature (i.e. cold in the summer and hot during the winter) into room 12 through duct 14. Thermostat 20, which is located within room 12, includes temperature set circuitry 22 which provides a stat signal representative of a desired air flow or velocity which will maintain the desired temperature. Temperature set circuitry 22 provides the stat signal as a function of sensed or actual temperature within room 12, and a desired temperature set by an occupant. In response to the stat signal, velocity control circuitry 24 actuates a damper 27 to bring the volume of air supplied to room 12 to the required level.

Velocity control circuitry 24 includes temperature sensitive resistive bridge 26, comparators 28 and 30, controlled voltage source 32, voltage divider 34, clockwise (CW) damper drive motor 36 and counterclockwise (CCW) damper drive motor 38. Bridge 26, which functions as a hot-wire anemometer air velocity sensor, includes a first node 40, a second node 42, a third node 44, and a fourth node 46. Nodes 44 and 46 function as an input port, while nodes 40 and 42 function as an output port. A heated wire resistor 48 is mounted within duct 14 and coupled between nodes 40 and 44. A temperature compensation resistor 50 is also mounted within duct 14 and is coupled between nodes 42 and 44. Bridge 26 also includes resistor 52 which is coupled between nodes 40 and 46, and potentiometer 54 which is coupled between nodes 42 and 46.

Comparator 28 has a first or non-inverting (+) input terminal connected to node 42 of resistive bridge sensor 26, and a second or inverting (−) input terminal connected to node 40. An output terminal of comparator 28 is coupled to an input or controlled terminal of controlled voltage source 32. A first output terminal of controlled voltage source 32 is coupled to node 44 of bridge 26, and to an input terminal of volatge divider 34. A second output terminal of controlled voltage source 32, as well as node 46 of bridge 26, are coupled to ground 56. An output terminal of voltage divider 34 is coupled to a first or non-inverting (+) input terminal of comparator 30, and back to thermostat 20 by means of a transmission line such as wire 58. A second or inverting (−) input terminal of comparator 30 is connected to receive the stat signal from temperature set circuitry 22. Comparator 30 has a first output terminal which is connected to clockwise damper motor 36, and a second output terminal which is connected to counterclockwise damper motor 38. Both damper motors 36 and 38 are mechanically coupled to damper 27. Velocity control circuitry 24 will typically be located in the ceiling above room 12, and therefore remote from thermostat 20.

In preferred embodiments temperature set circuitry 22 provides a stat signal within a three to six volt range which corresponds to a desired air flow of zero to three thousand cubic feet per minute through duct 14. Controlled voltage source 32 provides a nine to eighteen volt signal which corresponds to the zero to three thousand cubic feet per minute air flow through duct 14. The voltage potential provided by controlled voltage source 32 is representative of the actual flow of air through duct 14, and is coupled to the input port (nodes 44 and 46) of bridge 26. Air flowing through duct 14 will impinge upon resistors 48 and 50, thereby tending to cool them down and vary the state of balance of bridge 26. The state of balance of bridge 26 is sensed at its output port (nodes 40 and 42) by comparator 28. Bridge 26 is calibrated by adjusting potentiometer 54 in such a manner that it will be balanced with its nodes 40 and 42 being at the same potential and comparator 28 producing an output signal of zero volts when the voltage generated by controlled voltage source 32 corresponds to that of the actual flow of air through duct 14.

The state of balance of bridge 26 is therefore determined as a function of the air flow impinging upon resistors 48 and 50, and the voltage applied across nodes 44 and 46. When controlled voltage source 32 is generating a voltage representative of an air flow greater than that actually flowing through duct 14, bridge 26 will be out of balance in a first direction, with comparator 28 producing a first polarity (e.g. negative) output signal. The first polarity output signal causes the voltage generated by controlled voltage source 32 to drop until it corresponds to the actual air flow through duct 14, and bridge 26 is again balanced. Similarly, if the voltage being generated by controlled voltage source 32 is representative of an air flow less than that actually flowing through duct 14, bridge 26 will be out of balance in a second direction causing comparator 28 to produce a second polarity (e.g. positive) output signal. This second polarity output signal will tend to cause the voltage produced by controlled voltage source 32 to increase until it corresponds to that of the actual air flow and bridge 26 is again balanced. Circuit elements such as bridge 26, comparator 28, and controlled voltage source 32 are well known. Controlled voltage source 32, for example, can be formed by discrete circuit elements such as one or more transistors which regulate the flow of current through a capacitor so as to charge and discharge the capacitor to maintain the desired nine to eighteen volt level.

As discussed above, the voltage generated by controlled voltage source 32 will tend to be representative of the actual velocity of air flowing through duct 14. In the embodiment shown, this signal is divided by three by voltage divider 34 so as to correspond in range to the three to six volt stat signal provided by temperature set circuitry 22. Voltage divider 34 can, for example, comprise a simple resistive divider network. The signal output from voltage divider 34 is therefore a three to six volt signal representative of the actual flow of air through duct 14. Comparator 30 compares the actual flow signal from voltage divider 34 to the stat signal from temperature set circuitry 22, and controls damper drive motors 36 and 38, and therefore damper 27, as a function thereof. If the signal provided by voltage divider 34 indicates that the air flow through duct 14 is less than that represented by the stat signal from temperature set circuitry 22, and needed to maintain the desired temperature within room 12, comparator 30 will provide a first polarity signal which actuates clockwise damper motor 36 so as to rotate damper 27 in a clockwise direction, and thereby increase the air flow through duct 14. Similarly, should the signal provide by voltage divider 34 indicate that the actual flow through duct 14 is greater than that represented by the stat signal, comparator 30 will provide a second polarity signal activating counterclockwise damper motor 38. Damper 27 will then be rotated in the counterclockwise direction so as to close the damper and reduce the volume of air flowing through duct 14. The feedback provided by velocity control circuitry 24 will result in damper 27 regulating the flow of air through duct 14 so as to maintain a temperature within room 12 which corresponds to that set by occupant at thermostat 20.

Since the signal coupled to thermostat 20 from voltage divider 34 by wire 58 is representative of the actual velocity of air flowing through duct 14, a service technician can easily monitor this voltage simply by opening thermostat 20 and measuring this voltage at terminal 60. This can be done, for example, using a simple volt meter. Alternatively, this signal can be used to drive a visual velocity display 62 such as that illustrated in FIG. 1. Actual air flow through duct 14 and into room 12 can therefore be easily monitored by a service technician when service procedures so require. The service technician need no longer crawl into the ceiling to determine this parameter, a clumsy time-consuming operation which disturbs other personnel within room 12.

In the embodiment shown, thermostat 20 also includes a temperature display 64. Temperature display 64 provides a visual indication of the actual temperature within room 12. In still other embodiments, thermostat 12 can include circuitry or other provisions for limiting the minimum and maximum air flow rate settings available by thermostat 20. A pneumatic system of this type is disclosed in the Kreuter U.S. Pat. No. 4,467,956.

Although the present invention has been described with reference to preferred embodiments, workers skilled in the art will recognize that changes may be made in form and detail without departing from the spirit and scope of the invention.

What is claimed is:

1. For use in conjunction with an air distribution system of the type having a duct for distributing air to a room, a damper for regulating the flow of air through the duct, and a damper actuator responsive to damper drive control signals for controlling the damper, a circuit for providing the damper drive control signals, including:
   stat means to be positioned in the room for providing a stat signal representative of a desired flow of air through the duct;
   sensor means for sensing the flow of air and for and for providing an actual flow signal representative of the actual instantaneous flow of air through the duct;
   control means responsive to the stat means and the sensor means for providing damper drive control signals as a function of the stat signal and the actual flow signal; and
   transmission means having a first end coupled to the sensor means and a second end coupled to the stat means for providing the actual flow signal to the room.

2. The circuit of claim 1 wherein the stat means includes display means coupled to the second end of the transmission means for providing a visual display of the actual air flow.

3. The circuit of claim 1 wherein:
   the sensor means includes means for providing an electric actual flow signal representative of the actual flow of air through the duct; and
   the transmission means includes a wire having a first en coupled to the sensor means and a second end terminating at a terminal in the stat means.

4. The circuit of claim 1 wherein the sensor means includes:
   controlled signal source means for providing an actual flow signal representative of the actual flow of air through the duct as a function of a balance state signal;
   temperature sensitive bridge means, at least partially exposed to the flow of air in the duct, having an input port connected to receive the actual flow signal from the controlled signal source and an output port at which an output signal is provided as a function of the flow of air impinging upon the exposed portion of the bridge and the actual flow signal; and
   balance sensing circuit means coupled to receive the output signal from the output port of the bridge, for providing the balance state signal to the controlled signal source as a function of the balance state of the bridge, wherein the bridge will be in a balanced state when the actual flow of air equals the desired flow of air.

5. The circuit of claim 1 wherein the stat means includes temperature set means for providing the stat signal as a function of actual temperature within the room and a desired temperature within a room.

6. The circuit of claim 1 wherein:
   the stat means provides a stat signal having a first range representative of a desired range of flow of air thorugh the duct;
   the sensor means provides an actual flow signal having a second range representative of an actual range of flow of air through the duct; and
   the system further includes a signal divider means coupled between the sensor means and the control means for translating the actual flow signal to the first range representative of the actual flow of air through the duct.

7. The circuit of claim 1 wherein the control means includes a comparator for comparing the actual flow signal to the stat signal and for providing the damper drive control signals as a function of the comparison.

8. A variable volume air conditioning system for supplying air to a room, including:
   a conditioned air supply;
   a duct for distributing conditioned air from the contitioned air supply to the room;
   a damper positoned in the duct for regulating flow of air into the room;
   damper actuator means responsive to damper drive control signals for controlling the damper;
   thermostat means positioned at an accessible location within the room for providing a stat signal representative of a desired air flow;
   sensor means positioned with respect to the duct for sensing the flow of air and for providing an actual flow signal representative of actual instantaneous flow of air through the duct;
   control means responsive to the thermostat means and the sensor means for providing the damper drive control signals as a function of the stat signal and the actual flow signal; and
   transmission means having a first end coupled to the sensor means and a second end coupled to the thermostat means for providing the actual flow signal to the thermostat means.

9. The air conditioning system of claim 8 and further including display means coupled to the second end of the transmission means for providing a visual display of the actual air flow.

10. The circuit of claim 8 wherein:
    the sensor means includes means for providing an electric actual flow signal representative of the actual flow of air through the duct; and the transmission means includes a wire having a first end coupled to the sensor means and a second end coupled to the thermostat means.

11. The air conditioning system of claim 8 wherein the sensor means includes:
   controlled signal source means for providing an actual flow signal representative of the actual flow of air through the duct as a function of a balance state signal;
   temperature sensitive bridge means, at least partially exposed to the flow of air in the duct, having an input port connected to receive the actual flow signal from the controlled signal source and an outup port at which an output signal is provided as a function of the flow of air impinging upon the exposed portion of the bridge and the actual flow signal;
   balance sensing circuit means coupled to receive the output signal from the output port of the bridge, for providing the balance state signal to the controlled signal source as a function of the balance state of the bridge, wherein the bridge will be in a balanced state when the actual flow of air equals the desired flow of air.

12. The air conditioning system of claim 8 wherein the thermostat means includes temperature set means for providing the stat signal as a function of actual temperature within the room and desired temperature within the room.

13. The circuit of claim 8 wherein:
   the thermostat means provides a stat signal having a first range representative of a desired range of flow of air through the duct;
   the sensor means provides an actual flow signal having a second range representative of an actual range of flow of air through the duct; and
   the system further includes signal divider means coupled between the sensor means and the control means for translating the actual flow signal to a first range representative of the actual flow of air through the duct.

14. The air conditioning system of claim 8 wherein the control means includes a comparator for comparing the actual flow signal to the stat signal and for providing the damper drive control signals as a function of comparison.

15. The air conditioning system of claim 8 wherein the damper actuator means includes a motor.

* * * * *